June 6, 1944.  A. D. ROSE ET AL  2,350,533
LIQUID LEVEL GAUGE
Filed July 6, 1942   2 Sheets-Sheet 1

Inventors
Alexander D. Rose
& Hans Seegers
By Thiess, Olsen & Mecklenburger
Attys.

June 6, 1944.　　A. D. ROSE ET AL　　2,350,533
LIQUID LEVEL GAUGE
Filed July 6, 1942　　2 Sheets-Sheet 2
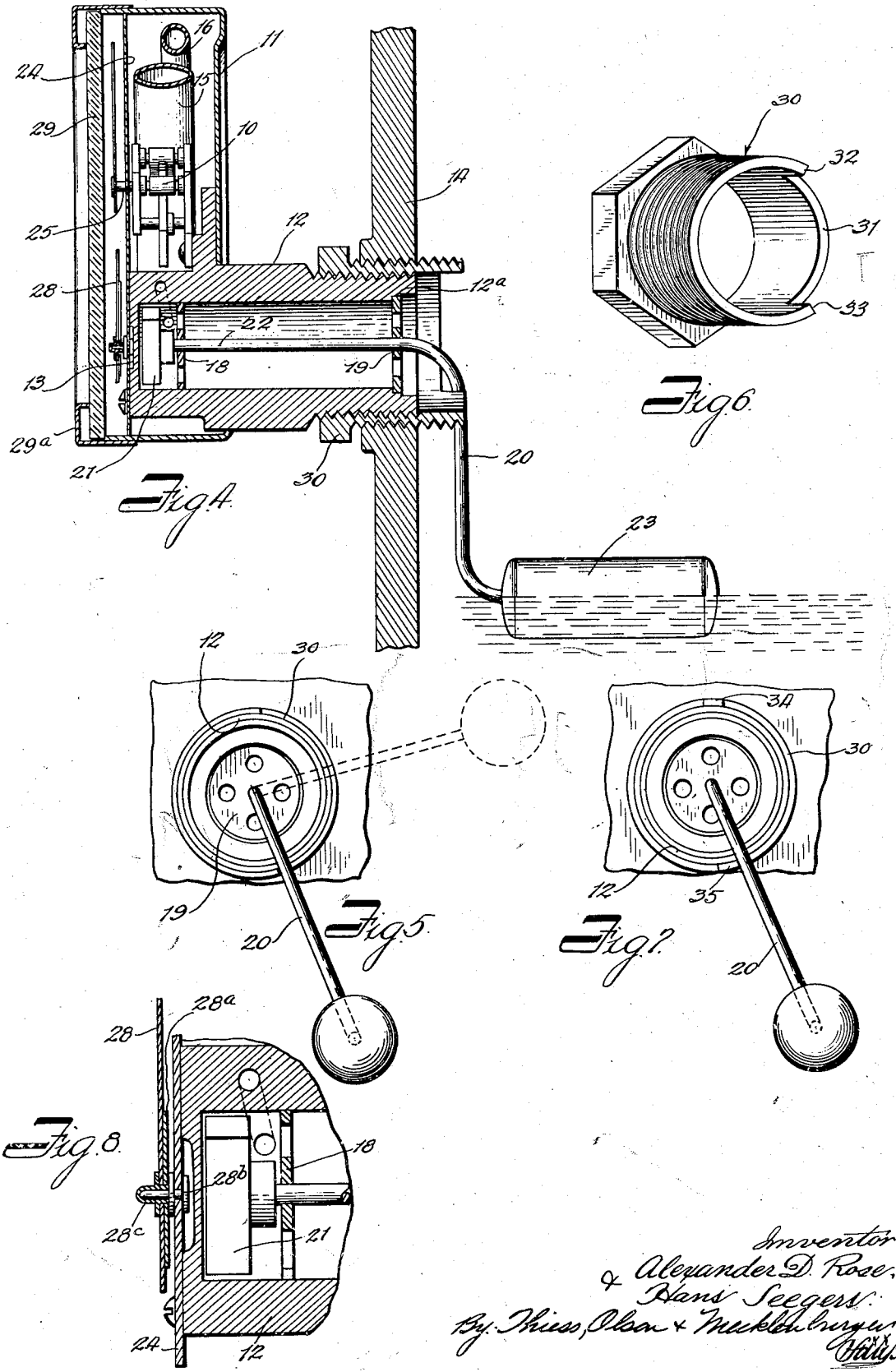

Patented June 6, 1944

2,350,533

UNITED STATES PATENT OFFICE 2,350,533

LIQUID LEVEL GAUGE

Alexander D. Rose, Des Plaines, and Hans Seegers, Chicago, Ill., assignors to Jas. P. Marsh Corporation, Chicago, Ill., a corporation of Illinois Application July 6, 1942, Serial No. 449,880

5 Claims. (Cl. 73—317)

This invention relates to gauge constructions, and more particularly to a combination pressure and liquid level-indicating gauge construction in which common means are employed to indicate pressure and liquid level characteristics on a single dial.

The present gauge construction is particularly adapted for installation on small steam boilers, or the like, where it is desired to provide a single compact gauge for indicating both pressure and water level, which gauge may be inserted directly in the wall of the boiler in close proximity to the normal water level of the boiler. It requires only a single opening in the boiler through which steam pressure and water level indications may be transmitted, in which opening the gauge is supported. It is particularly useful inasmuch as all communication with the boiler is through a single connection, thus reducing the number of machine operations for its manufacture and materially simplifying its installation.

The present invention is especially adapted to accurately register variations in liquid level and is provided with a combination adaptor sleeve and liquid level float movement-limiting member adapted for use in such a construction.

It is an object of the present invention to provide in a single unit an integral liquid level and pressure gauge.

It is also an object to provide a simple, compact and unitary combined gauge for use primarily on home heating plants, small boilers, etc.

A further object is to provide in structural combination a water level-indicating apparatus and a steam pressure-indicating apparatus in a common compact unit.

The pressure gauge employed in this device may comprise a suitable Bourdon tube pressure-indicating mechanism which may be supported in operative communication with other portions of the gauge and may be enclosed in a casing in a manner hereinafter particularly recited in detail.

This invention includes means whereby the limits of movement of the liquid level gauge may be adjusted from the exterior of the boiler and after the gauge has been installed in place. This permits adjustment of the limits of movement to meet requirements of installation and to correct for changes arising after installation. The use of limit means of this character is made possible by the particular operating means shown.

It is, therefore, an additional object of the present invention to provide simple adjustable means whereby the limits of movement of a liquid level-indicating float may be adjusted from without the gauge.

A further object is to provide a liquid level-indicating gauge having a minimum number of parts and to combine those parts in a simple construction to provide a freely operating readily adjustable assembly.

Other objects and advantages will appear from a consideration of the following detailed specification. For a more complete understanding of this invention, reference may now be had to the drawings, in which:

Fig. 4 is a vertical sectional view of the structure illustrated in Figs. 2 and 3;

Fig. 5 is a rear end view of the structure shown in Fig. 4;

Fig. 6 is a perspective view of the form of liquid level indicator movement-limiting sleeve shown in Fig. 5;

Fig. 7 is an end view similar to Fig. 5 showing another form of sleeve in place; and Fig. 8 is an enlarged detailed sectional view of a portion of Fig. 4.

Figure 1:
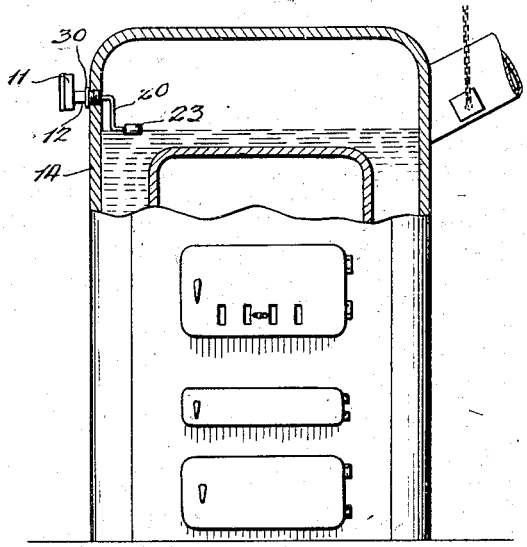
Figure 1 is a front elevation partly in section of an ordinary steam boiler with one embodiment of the combined liquid level and pressure-indicating gauge in place.
Figures 2, 3:
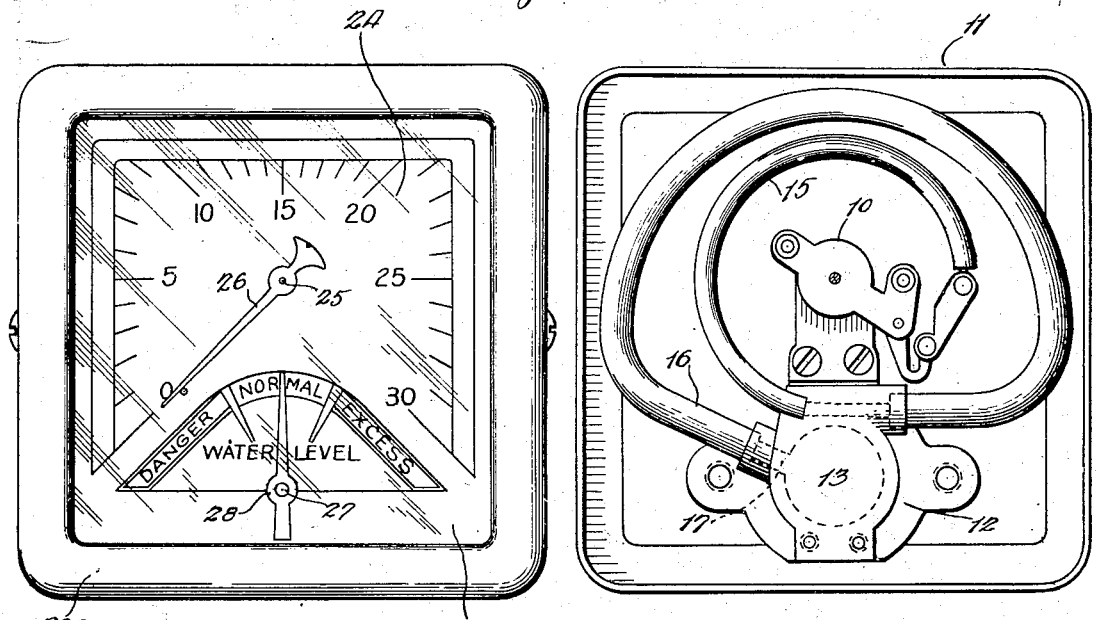
Fig. 2 is an enlarged front assembled view of the embodiment illustrated in Fig. 1.
Fig. 3 is a front view similar to Fig. 2 with the dial and bezel removed.

In the embodiment illustrated in the drawings, the device comprises a pressure indicating assembly 10 and an enclosing housing 11 secured to and supported upon a horizontally extending hollow nipple 12. This nipple 12 has its inner end closed by an end wall 13 and is threaded at its opposite end for insertion into a similarly threaded opening in the wall 14 of a boiler or other pressure and liquid-containing chamber.

Within the housing 11 and securely supported upon said nipple 12, adjacent its closed end, is mounted the pressure-indicating mechanism 10 which may be of any suitable construction, preferably including a Bourdon tube 15. One end of this Bourdon tube communicates with an internal siphon tube 16 which surrounds the entire pressure-indicating mechanism and connects with a passage 17 leading to the hollow central bore of the nipple 12. All connections of the pressure-indicating mechanism are soldered or otherwise secured to the supporting nipple 12, so that they become integral therewith and there is no moving coupling or journaled part which may leak and permit pressure to escape from within the nipple.

The interior of the nipple is preferably provided with a step 12a, as shown in Fig. 4. As there shown, discs or journal plates 18 and 19, perforated to permit free passage of pressure therethrough, may be inserted into the nipple from the rear to support one end of a crank-shaped liquid level float arm 20 in the manner hereinafter set forth. The closed front end wall 13 of the nipple comprises a thin imperforate wall portion which is preferably formed integral with the nipple.

With this construction, a magnet 21 mounted upon the inner end 22 of the crank-shaped float arm 20 may be inserted through the open end of the nipple and may be journaled for rotation in the journal plates or discs 18 and 19 with the magnet positioned in close proximity to the integral end wall of the nipple.

The projecting outwardly extending portion of the crank-shaped float arm has a depending portion, the lowermost end of which is secured to a float 23 of sufficient buoyancy to bear the weight of the depending portion of said float arm and to move the float arm to indicate any change in liquid level within the chamber. Upon a rise in the liquid level, the float 23 will also rise and will rotate the float shaft and its attached magnet.

A full size dial 24 having calibrated pressure and liquid level scales is provided and is secured to the closed end of said nipple flush with its thin end wall, as shown in detail in Fig. 8. The dial 24 has a centrally disposed opening through which the pointer shaft 25 of the pressure pointer hand 26 may extend. A stub shaft 27 is mounted on the lower portion of dial 24 and forms a bearing for a freely movable pointer 28 operable to indicate changes in liquid level. This pointer may be provided with an adjacent portion 28a of magnetic permeable material or the pointer itself may be formed of magnetic permeable material, if desired.

As shown in detail in Fig. 8, the pointer 28 is mounted immediately adjacent and in parallel apposition to the magnet 21, so as to be subject to its magnetic field. It is retained in place on said stub shaft 27 by said magnetic field and is caused to rotate by said magnet in accordance with movement thereof in response to changes in the liquid level. Thus changes in liquid level may be indicated without any mechanical connection between the float arm and the pointer, permitting the closed integral end wall 13 to remain imperforate and affording no possibility of pressure leakage at this point. This makes unnecessary any stuffing box or packing gland. A cover glass 29 is secured in place by the bezel 29a as indicated and completes the enclosure of both mechanisms.

The manner in which the water level indicating pointer 28 is secured in place adjacent the thin end wall 13 of the nipple 12 is shown in detail in Fig. 8. The dial 24 is positioned closely adjacent the end of the nipple, as by the screws shown, and supports a stub shaft 28b which may be riveted in place in the manner shown. Over the forwardly projecting tip of this shaft may be positioned the bearing 28c which supports the needle 28 and the strip of permeable material 28a.

With this arrangement, the needle is held in place solely by the attraction of the magnet 21, the movements of which are closely followed by the needle, and it will be noted that the needle will not be injured by movement of the magnet beyond the range of movement of the needle, when such movement of the magnet may be necessary as in the installation of the device.

The construction shown and described provides a gauge combination which is particularly free from trouble and wherein all possibility of pressure loss is avoided. Thus the gauge may be relied upon for accurate pressure and liquid level readings with the assurance that there are no connections in its construction which might leak or influence its accuracy. It also provides in a single compact housing, a simple assembly of parts, all supported upon and operated through a common single central means, but in which the function of neither interferes with the other.

In the present embodiment, there is disclosed a float travel limit means which is adjustable independent of the gauge proper and may be adjusted from without the boiler while the gauge is in place. It comprises an adaptor sleeve 30 shown in Figs. 4, 5 and 6. In the sleeve of the character there illustrated, a cutout portion 31 provides a recessed area having end walls 32 and 33. The float level arm 20 moves in said recessed area and is limited in its movement by the end walls 32 and 33.

If desired, the sleeve may be modified as shown in Fig. 7, where it is shown provided with projections 34 and 35 instead of the end walls above. With this arrangement, movement of the float arm is similarly controlled and the extent of such movement may also be externally adjusted with the gauge in place.

It will be apparent that by the use of the magnetic connection between the float arm and liquid level indicator needle, the sleeve and float may be rotated with respect to the gauge body as it is threaded into place without interfering with the ultimate magnetic connection between the limit level float arm and its indicator pointer.

While the particular embodiments of the invention have been shown, it will be understood, of course, that it is not desired that the invention be limited thereto since modifications may be made, and it is, therefore, contemplated by the appended claims to cover any such modifications as fall within the true spirit and scope of the invention.

Having thus described the invention, what is claimed and desired to be secured by Letters Patent is:

1. In a gauge for the indication of liquid level the combination with a single supporting nipple of a liquid level gauge having a float, a float arm which is crank-shaped with one end portion of the crank pivoted in the nipple and its opposite end secured to said float and an adjustable threaded sleeve surrounding the outer end portion of the nipple, said sleeve having spaced projections extending in the path of movement of the intermediate portion of the crank-shaped float arm to limit the movement of the float arm.

2. In a gauge for installation in the wall of a liquid chamber to indicate liquid level, a single hollow supporting nipple threaded for insertion into the wall of said chamber, a liquid level-indicating mechanism comprising a crank-shaped float arm having one end portion for extending within said chamber and the other end portion journaled within said supporting nipple, a permanent magnet mounted interiorly of said nipple for movement with said float arm, and an indicator hand of magnetic permeable material mounted exteriorly of said nipple and within the field of said magnet for rotation therewith, and an adjustable threaded sleeve surrounding the outer end portion of said nipple and having spaced projections extending into the field of movement of said float arm for movement-limiting engagement therewith, said sleeve having a portion for extending without said chamber whereby said spaced projections may be externally adjusted to limit movement within said chamber.

3. In a liquid level gauge wherein a liquid level indicator is mounted upon a hollow nipple and is operated by a float arm extending therethrough the combination of a float, a float arm which is crank-shaped with one end portion of the crank pivoted in the nipple and its opposite end secured to said float and an adjustable threaded sleeve surrounding the outer end portion of the nipple, said sleeve having spaced projections extending in the path of movement of the intermediate portion of the crank-shaped float arm to limit the movement of the float arm, said sleeve being bodily rotatable to vary the position of said spaced stops.

4. A single nipple gauge for indicating liquid level conditions in a closed chamber, said gauge comprising a nipple having a central passage and a threaded portion for insertion in a threaded opening in a wall of a chamber, a liquid level indicator mounted upon the end of said nipple opposite the threaded portion, said indicator having a magnetic permeable hand, a magnet disposed within the central pressure-transmitting passage of said nipple and in relative proximity to said hand to induce liquid level-indicating movemnt thereof, and a crank-shaped float arm having one end portion journaled in said central pressure-transmitting passage and supporting said magnet and its other end portion for extending within said chamber, said float arm having a float portion, and a float arm movement-limiting sleeve surrounding the outer end portion of said nipple and engaging the wall of said chamber, said sleeve having float arm movement-limiting projections extending into the path of said float arm to restrict movement of said float arm at each extent of its movement.

5. A liquid level gauge wherein changes in liquid level are indicated over a dial, said gauge comprising a single supporting nipple having a hollow interior open at one end for communication with a chamber and closed at the opposite end, a liquid level indicating mechanism including a crank-shaped float arm having an end axially journaled within the pressure-receiving opening in said nipple and having a float-bearing portion for extending into said pressure chamber, said arm having a magnet secured thereto to rotate within said pressure-receiving passage, and a liquid level-indicating hand formed of magnetic permeable material and journaled outside of said nipple adjacent the closed end and within the field of said magnet, said indicator hand being operable through said nipple by means of the field of said magnet to follow the movement of said magnet and indicate changes in liquid level in said chamber, and an adjustable threaded sleeve surrounding the open end portion of said nipple and having spaced stops disposed in the path of movement of said float arm for movement-limiting engagement therewith, a portion of said sleeve being adapted for extending without said chamber so as to be adjustable when said gauge is in place.

ALEXANDER D. ROSE.
HANS SEEGERS.